Jan. 12, 1943.  J. C. LINGOLD  2,308,478
FLUSH VALVE ACTUATOR
Filed Nov. 6, 1941
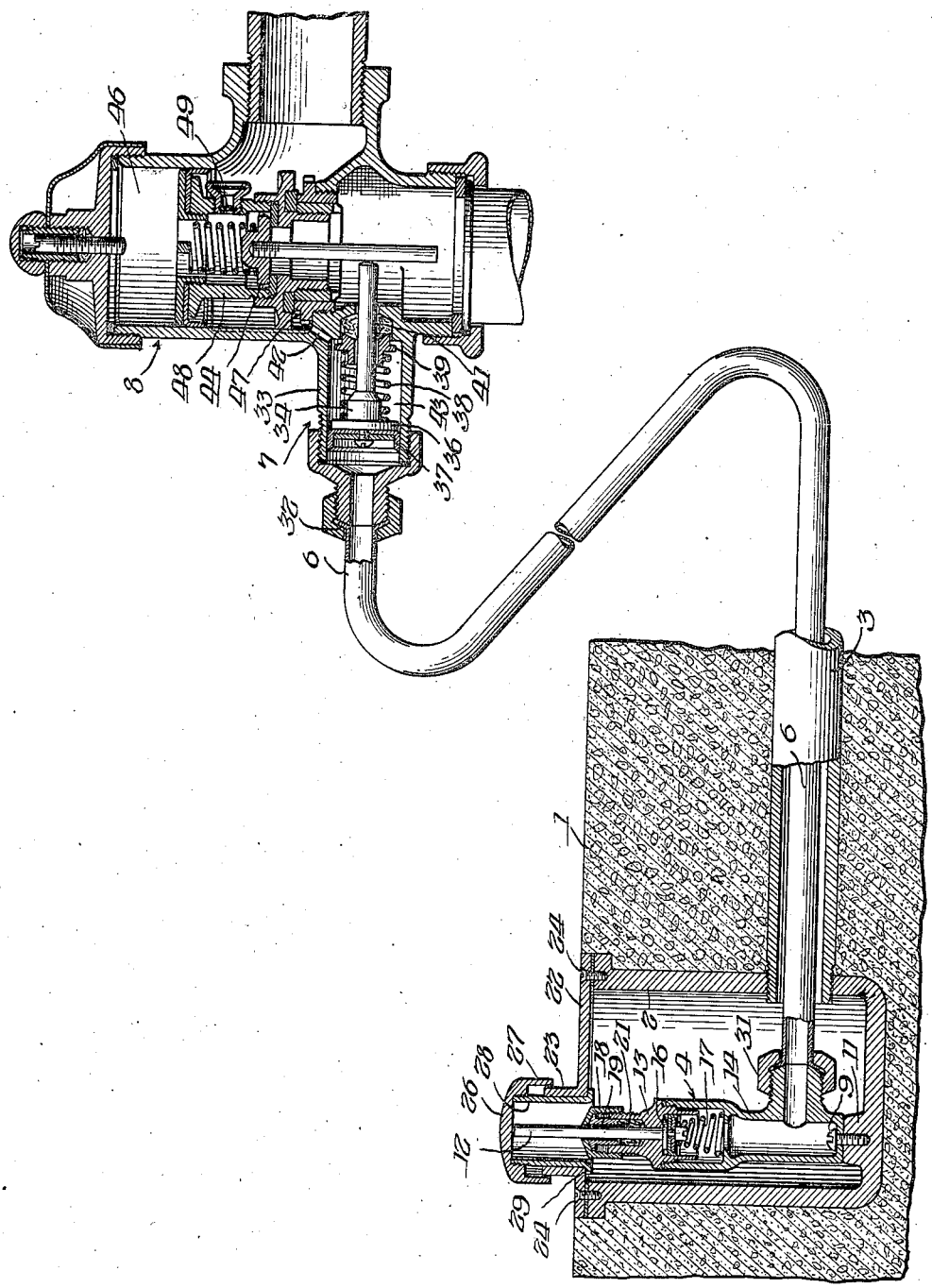
Inventor:
John C. Lingold
By: Joseph O. Lange, Atty.

Patented Jan. 12, 1943

2,308,478

UNITED STATES PATENT OFFICE 2,308,478

FLUSH VALVE ACTUATOR

John C. Lingold, Chicago, Ill., assignor to Crane Co., Chicago, Ill., a corporation of Illinois Application November 6, 1941, Serial No. 417,985

3 Claims. (Cl. 137—93)

My invention relates to valve actuation and more particularly to flush valves of the type used in connection with plumbing fixtures; more specifically, my invention relates to a device for actuating flush valves at a distance, for instance, from a position in the wall or in the floor near the plumbing fixture but at a substantial distance from the flush valve itself. The arrangement is desirable in the interests of greater convenience and sanitation. It has been my purpose to provide a relatively simple actuating mechanism requiring only a small number of piping connections between the flush valve and the operating location. In the latter respect my device requires but a single conduit or tube as compared with the two or more which have normally been required in the past with conventional actuating devices of this type.

Other and further objects will become apparent from the disclosures in the following specification and the accompanying drawing, in which is shown a vertical sectional view of my device, showing the manner of its installation with relation to a conventional piston-type flush valve.

As shown in the drawing, the numeral 1 indicates the floor of a toilet room below the surface of which is positioned the housing 2 and the conduit 3. Within the housing 2 is a primary or actuating piston assembly generally designated 4 which communicates through a tube 6 with the secondary or actuated piston assembly generally designated 7, the latter being operatively connected with the flush valve 8 as will subsequently be brought out in greater detail. The conduit 3 is provided surrounding the tube 6 so that the latter may be readily removed in case of repair or replacement.

The primary or actuating piston assembly 4 is firmly secured within the housing 2 by means of the screw 9 which is threadedly engaged with the housing boss 11. The actuating piston 12 is journally mounted within the bonnet member 13, the latter being threadedly engaged with the casing 14. A shoulder 16 formed upon a lower portion of the piston 12 serves the two-fold purpose of limiting the piston's upward travel and affording an upper bearing for the coil spring 17 whose purpose is to maintain the piston in a normally lifted position, as shown. The usual packing nut 18, gland 19 and packing 21 is provided at the upper end of the bonnet 13 to retain fluid within the casing. A closure plate 22, having the upwardly extending cylindrical section 23, is removably attached to the housing 2 by means of screws 24. A pedal member 26 rests upon the upper end of the piston 12 so that when a downward force is exerted on the pedal member 26, the piston 12 is moved downwardly, displacing fluid from the interior of the casing 14 into the tubing 6. A downwardly extending lip 27, overlapping and outside of the upward cylindrical extension 23, is provided for the pedal member so as to prevent the entry of foreign matter into the interior of the housing 2. A cylindrical member 28, being reciprocably journaled within the extension 23, is provided for the twofold purpose of preventing the pedal member from canting or cocking and also to limit the upward travel of the pedal member by the abutment of the shoulder 29 against the interior of the cover plate 22 in the upward direction. The usual flared-end connections are provided at 31 and 32 for the ends of the tubing 6.

Directing specific attention now to the secondary or actuated piston assembly, the casing portion 33 is but an integral extension of the flush valve casing 8. Of course, it is not necessary that the casing 33 and the casing 8 be integral, since it should be obvious that they may be separate pieces and still perform their function in the manner desired. The secondary piston 34 has an enlarged end portion 36 carrying a cup-shaped resilient member 37 made of rubber, leather or the like, and is maintained normally in the extreme left position by the coil spring 38 which bears at the right end against the axially movable gland 39 and in turn against the packing 41, thereby keeping the packing continually under compression so as to require no periodic tightening adjustment. A passageway 42 is provided connecting the piston member 43 with the valve inlet.

Directing attention now to the manner in which the flush valve 8 may be operated by my device, assume the parts are all in the positions shown in the drawing. To operate the flush valve 8, the pedal member 26 is depressed by the operator's foot (or by his hand in the event that the housing 2 is mounted in the wall instead of the floor as shown); the actuating piston 12 is thus forced downwardly into the casing 14, displacing fluid into the tube 6, causing an equivalent amount of fluid to be displaced out of the other end of the tube into the secondary cylinder thereby moving the secondary piston 34 to the right against the spring 38. This opens the auxiliary valve 44, relieving pressure in the dashpot chamber 46. The area of the dashpot chamber 46 being greater than the area through the main valve seat 47, the water supply to the valve forces the main valve 48 upward, opening the valve and forcing water from the dashpot chamber through the auxiliary valve 44 to the bowl. When the pedal member 26 is released, the coil springs 17 and 38 urge the pistons 12 and 34 back into the positions shown in the drawing, and the auxiliary valve 44 closes. Water from the supply then enters the dashpot chamber 46 through the by-pass aperture 49, allowing the main valve 48 to travel downward, causing the valve to close.

In order that the device may be ready to operate at all times it is essential that the tube 6 and the cylinders connected by it remain completely full of water or other fluid at all times. This is assured in my structure by means of the check valve character of the cup leather or cup-shaped rubber or the like designated 37; thus, when the tube 6 is not completely filled with water the required amount automatically flows past the cup leather 37 into the tube 6. It should be obvious that many other forms of check valves may be employed in connection with the piston 34 to accomplish this same desirable purpose.

It should also be apparent from the disclosures herein made that the invention may take many forms other than that specifically shown and described; for instance, a pair of flexible diaphragms or bellows may be employed instead of the piston and cylinder structures shown. It is emphasized that the specific structures shown in the drawing have been presented only by way of illustration and not by way of limitation. I therefore desire to be limited only by the scope of the appended claims.

I claim:

1. A valve actuating device comprising manually movable means positioned at a distance from the said valve, operating means for said valve positioned proximately thereto, said operating means and said manually movable means being connected by a conduit, said conduit being filled normally with fluid, whereby upon movement of said manually movable means fluid is displaced through said conduit into said operating means thereby causing said valve to be actuated, check valve means associated with said operating means whereby the said conduit is maintained substantially filled with fluid supplied from the interior of said valve.

2. A device for actuating a flush valve comprising a manually movable liquid-tight member positioned within a casing and disposed at a distance from said flush valve, a second movable member mounted within a casing adjacent the said flush valve and operatively connected with said valve, a liquid-containing conduit interconnecting the said casings of said movable members whereby movement of said manually movable member displaces liquid through said conduit and moves said second movable member, thereby initiating an operating cycle of said flush valve, means associated with said second movable member for admitting fluid from said valve to said conduit so as to keep said conduit filled with liquid at all times, said latter means being adapted to prevent the flow of liquid from said conduit to the said valve.

3. A device for actuating a flush valve, the combination including a casing, a manually movable piston positioned within the said casing and disposed at a distance from the said flush valve, a second casing adjacent the said flush valve, a second piston mounted within the said second casing and operatively connected with said flush valve, a fluid containing conduit interconnecting the said pistons whereby movement of said manually movable piston displaces fluid through said conduit and moves said second piston, thereby actuating the said flush valve, a cup plunger cooperating with the said second piston so that upon actuation of the manually movable piston leakage therepast is prevented by the said cup plunger and upon release of the said manually movable piston the said conduit is maintained substantially filled with fluid from the interior of the said valve flowing predeterminedly past the said cup plunger.

JOHN C. LINGOLD.